(12) United States Patent
Mufti

(10) Patent No.: US 10,594,741 B2
(45) Date of Patent: Mar. 17, 2020

(54) SUPPRESSING THIRD PARTY REGISTRATION AND THIRD PARTY DEREGISTRATION ACTIONS

(71) Applicant: T-Mobile USA, Inc., Bellevue, WA (US)

(72) Inventor: Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 357 days.

(21) Appl. No.: 14/568,633

(22) Filed: Dec. 12, 2014

(65) Prior Publication Data

US 2016/0037471 A1 Feb. 4, 2016

Related U.S. Application Data

(60) Provisional application No. 62/033,026, filed on Aug. 4, 2014.

(51) Int. Cl.
*H04L 29/06* (2006.01)
*H04W 76/50* (2018.01)
(Continued)

(52) U.S. Cl.
CPC ...... *H04L 65/1016* (2013.01); *H04L 65/1006* (2013.01); *H04L 65/1069* (2013.01);
(Continued)

(58) Field of Classification Search
None
See application file for complete search history.

(56) References Cited

U.S. PATENT DOCUMENTS 7,257,374 B1 8/2007 Creigh
8,655,357 B1 * 2/2014 Gazzard ................. H04W 4/20
455/435.1
(Continued)

FOREIGN PATENT DOCUMENTS

CN 101110833 1/2008
CN 101690285 3/2010
(Continued)

OTHER PUBLICATIONS

PCT Search Report and Written Opinion dated Oct. 13, 2015 for PCT Application No. PCT/US15/38634, 11 pages.
(Continued)

*Primary Examiner* — Jeffrey M Rutkowski
*Assistant Examiner* — Ning Li
(74) *Attorney, Agent, or Firm* — Lee & Hayes, P.C.

(57) ABSTRACT

An S-CSCF component within an IMS receives a registration request associated with the UE. The registration request is associated with the UE switching from a first network that provides support for a first feature set to a second network that provides support for the second feature set. Instead of performing registration actions and deregistration actions with an application server in response to the registration request, the S-CSCF compares the feature tags of the registration request with previous feature tags that are associated with currently registered features. The S-CSCF causes a registration action to be performed in response to determining that the current registration request includes a feature tag that is not currently registered. The S-CSCF causes a deregistration action to be performed in response to determining that the current registration request does not include a feature that is currently registered.

16 Claims, 7 Drawing Sheets

(51) Int. Cl.

| | | |
|---|---|---|
| H04W 4/90 | (2018.01) | |
| H04W 36/00 | (2009.01) | |
| H04W 36/14 | (2009.01) | |
| H04W 60/00 | (2009.01) | |
| H04W 76/22 | (2018.01) | |
| H04W 60/06 | (2009.01) | |
| H04W 88/18 | (2009.01) | |

(52) U.S. Cl.
CPC ......... *H04W 4/90* (2018.02); *H04W 36/0022* (2013.01); *H04W 36/14* (2013.01); *H04W 60/005* (2013.01); *H04W 76/50* (2018.02); *H04W 36/0016* (2013.01); *H04W 60/06* (2013.01); *H04W 76/22* (2018.02); *H04W 88/182* (2013.01)

(56) References Cited

U.S. PATENT DOCUMENTS

| | | | |
|---|---|---|---|
| 8,718,636 | B1 | 5/2014 | Pankajakshan |
| 8,879,503 | B2 | 11/2014 | Dwyer et al. |
| 8,995,959 | B2 | 3/2015 | Cakulev et al. |
| 2004/0199641 | A1 | 10/2004 | Bajko |
| 2004/0199649 | A1 | 10/2004 | Tarnanen et al. |
| 2005/0071679 | A1 | 3/2005 | Kiss et al. |
| 2006/0084438 | A1 | 4/2006 | Kwon |
| 2006/0239229 | A1 | 10/2006 | Marinescu et al. |
| 2008/0039085 | A1 | 2/2008 | Phan-Anh |
| 2008/0089272 | A1 | 4/2008 | Ahokangas |
| 2008/0091814 | A1 | 4/2008 | Xie |
| 2008/0126535 | A1 | 5/2008 | Zhu et al. |
| 2008/0208937 | A1* | 8/2008 | Yukumoto .............. G06F 12/02 |
| 2008/0299927 | A1 | 12/2008 | Tenbrook et al. |
| 2009/0017824 | A1 | 1/2009 | Lee et al. |
| 2009/0068996 | A1* | 3/2009 | Bakker ............... H04L 65/1016 |
| | | | 455/414.1 |
| 2009/0296566 | A1 | 12/2009 | Yasrebl et al. |
| 2009/0296567 | A1 | 12/2009 | Yasrebi et al. |
| 2010/0054209 | A1 | 3/2010 | Mahdi |
| 2010/0223492 | A1 | 9/2010 | Farrugia et al. |
| 2010/0311386 | A1 | 12/2010 | Edge et al. |
| 2010/0329243 | A1 | 12/2010 | Buckley et al. |
| 2010/0329244 | A1 | 12/2010 | Buckley et al. |
| 2011/0013597 | A1 | 1/2011 | Hwang et al. |
| 2011/0040836 | A1 | 2/2011 | Allen et al. |
| 2011/0040882 | A1 | 2/2011 | Delos Reyes et al. |
| 2011/0058520 | A1 | 3/2011 | Keller et al. |
| 2011/0230192 | A1 | 9/2011 | Tiwari |
| 2011/0296034 | A1 | 12/2011 | Mayer et al. |
| 2012/0039303 | A1 | 2/2012 | Stenfelt et al. |
| 2012/0063420 | A1 | 3/2012 | Long et al. |
| 2012/0069731 | A1 | 3/2012 | Tooher et al. |
| 2012/0083240 | A1 | 4/2012 | Patel |
| 2012/0120914 | A1* | 5/2012 | Sedlacek ............. H04W 60/005 |
| | | | 370/331 |
| 2012/0172042 | A1 | 7/2012 | Drevon et al. |
| 2012/0236709 | A1 | 9/2012 | Ramachandran et al. |
| 2012/0258712 | A1 | 10/2012 | Rozinov |
| 2012/0295617 | A1 | 11/2012 | Anchan et al. |
| 2013/0021998 | A1 | 1/2013 | Shatsky |
| 2013/0023265 | A1 | 1/2013 | Swaminathan et al. |
| 2013/0024574 | A1* | 1/2013 | Lau .................... H04L 65/1069 |
| | | | 709/227 |
| 2013/0029629 | A1 | 1/2013 | Lindholm et al. |
| 2013/0051362 | A1 | 2/2013 | Lee et al. |
| 2013/0143565 | A1 | 6/2013 | Zisimopoulos et al. |
| 2013/0151586 | A1 | 6/2013 | Morishige et al. |
| 2013/0174254 | A1* | 7/2013 | Gould ................. H04L 61/1511 |
| | | | 726/22 |
| 2013/0179583 | A1* | 7/2013 | Foti .................... H04L 65/1016 |
| | | | 709/228 |
| 2013/0183965 | A1 | 7/2013 | Ramachandran et al. |
| 2013/0195076 | A1 | 8/2013 | Keller et al. |
| 2013/0329567 | A1 | 12/2013 | Mathias et al. |
| 2014/0051443 | A1 | 2/2014 | Diachina et al. |
| 2014/0064156 | A1 | 3/2014 | Paladugu et al. |
| 2014/0143393 | A1* | 5/2014 | Martinez Perea .. H04L 65/1016 |
| | | | 709/221 |
| 2014/0176660 | A1 | 6/2014 | Khay-Ibbat et al. |
| 2014/0219241 | A1 | 8/2014 | Parron |
| 2014/0369267 | A1* | 12/2014 | Ni ......................... H04W 76/10 |
| | | | 370/329 |
| 2014/0370842 | A1 | 12/2014 | Abtin et al. |
| 2014/0378105 | A1* | 12/2014 | Suryavanshi ........... H04L 51/18 |
| | | | 455/414.1 |
| 2015/0003342 | A1 | 1/2015 | Swaminathan et al. |
| 2015/0016420 | A1 | 1/2015 | Balabhadruni et al. |
| 2015/0024751 | A1 | 1/2015 | Wong et al. |
| 2015/0382251 | A1 | 12/2015 | Wang et al. |
| 2016/0021579 | A1 | 1/2016 | Mufti |
| 2016/0021580 | A1 | 1/2016 | Mufti |
| 2016/0029228 | A1 | 1/2016 | Mufti |
| 2016/0037390 | A1 | 2/2016 | Mufti et al. |
| 2016/0149965 | A1 | 5/2016 | Kubik et al. |
| 2016/0150497 | A1 | 5/2016 | Janosi et al. |
| 2016/0234744 | A1 | 8/2016 | Wu et al. |
| 2016/0249401 | A1 | 8/2016 | Tanaka et al. |
| 2016/0286516 | A1* | 9/2016 | Wu ........................ H04W 4/005 |
| 2018/0368028 | A1 | 12/2018 | Mufti |

FOREIGN PATENT DOCUMENTS

| | | | |
|---|---|---|---|
| CN | 101742589 | 6/2010 | |
| CN | 101835121 | 9/2010 | |
| CN | 102387557 | 3/2012 | |
| CN | 102448036 | 5/2012 | |
| CN | 102484850 | 5/2012 | |
| CN | 103561432 | 2/2014 | |
| CN | 103716851 | 4/2014 | |
| EP | 2667659 | 11/2013 | |
| KR | 1020090065320 | 6/2009 | |
| KR | 1020100102363 | 9/2010 | |
| WO | WO2007047477 | 4/2007 | |
| WO | WO2012062379 | 5/2012 | |
| WO | 2013075746 | 5/2013 | |
| WO | WO2013104651 | 7/2013 | |
| WO | 2013114158 | 8/2013 | |
| WO | WO2013149918 | 10/2013 | |
| WO | WO2013156061 | 10/2013 | |
| WO | WO 2014/183668 A1 * | 5/2014 | .............. H04W 8/08 |
| WO | WO2014101500 | 7/2014 | |
| WO | WO2014124658 | 8/2014 | |

OTHER PUBLICATIONS

PCT Search Report and Written Opinion dated Oct. 15, 2015 for PCT Application No. PCT/US15/38652, 14 pages.

PCT Search Report and Written Opinion dated Oct. 19, 2015 for PCT Application No. PCT/US15/39414, 12 pages.

"3GPP TS 24.229 V11.12.0", 3rd Generation Partnership Project; Technical Specification Group Core Network and Terminals; IP multimedia call control protocol based on Session Initiation Protocol (SIP) and Session Description Protocol (SDP); Stage 3 (Release 11), retrieved at <<http://www.3gpp.org/DynaReport/24229.htm>>, Jun. 27, 2014, 786 pages.

PCT Search Report and Written Opinion dated Nov. 11, 2015 for PCT Application No. PCT/US15/43467, 12 pages.

PCT Search Report and Written Opinion dated Nov. 27, 2015 for PCT Application No. PCT/US15/43454, 10 pages.

Office action for U.S. Appl. No. 14/815,831, dated Dec. 2, 2016, Mufti et al., "Telecommunications Network Emergency-Call Handover", 13 pages.

"Digital cellular telecommunications system (Phase 2+); Universal Mobile Telecommunications System (UMTS); LTE; Mobile radio interface signalling layer 3;" General Aspects. 3GPP TS 24.007 V9.0.0. Oct. 2010. pp. 13, 15-17, 106-107.

Office action for U.S. Appl. No. 14/689,318, dated Oct. 24, 2016, Mufti, "Telecommunications Network Non-Establishment Response", 18 pages.

(56) References Cited

OTHER PUBLICATIONS

Office action for U.S. Appl. No. 14/552,871, dated Oct. 6, 2016, Mufti, "Telecommunication Network Pre-Establishment Service Interruption Response", 23 pages.
Office action for U.S. Appl. No. 14/552,871, dated May 25, 2017, Mufti, "Telecommunication Network Pre-Establishment Service Interruption Response", 27 pages.
Office action for U.S. Appl. No. 14/689,318, dated Jun. 1, 2017, Mufti, "Telecommunications Network Non-Establishment Response", 18 pages.
Office action for U.S. Appl. No. 14/552,871, dated Feb. 10, 2017, Mufti, "Telecommunication Network Pre-Establishment Service Interruption Response", 23 pages.
The Extended Euroepan Search Report dated Jan. 30, 2018 for European patent application No. 15829069.2, 15 pages.
Lucent Technologies, "Filter criteria matching and generation of third-Party Register request for network-initiated derigstration", 3GPP Draft; N1-050222, 3rd Generation Partnership Project (3GPP), Mobile Competence, France, vol. TSG CN, No. Sydney, Australia; Mar. 2, 2005, retrieved on Mar. 2, 2005, 5 pgs.
Nokia, "Third party registration optimisation", 3GPP Draft; N1-041441_3RDPARTYREGOPT-A, 3rd Generation Partnership Project (3GPP), France, vol. CN WG1, No. Sophia Antipolis, France, Aug. 10, 2004. retrieved on Aug. 10, 2004, 7 pgs.
The Chinese Office Action dated Dec. 8, 2017 for Chinese patent application No. 201580051477.5, a counterpart foreign application of U.S. Pat. No. 9,699,211, 15 pgs.
The Extended Euroepan Search Report dated Feb. 13, 2018 for European patent application No. 15824514.2, 12 pages.
The Extended Euroepan Search Report dated Feb. 19, 2018 for European patent application No. 15830023.6, 12 pages.
Nokia Siemens Networks et al: "Multiple EATF addressing",3GPP Draft; S2-113311, vol. SA WG2, No. Naantali; Jul. 11, 2011, Jul. 5, 2011, XP050548597, 2 pages.
DoCoMo, et al., "Handover Cancellation Timing", 3GPP Draft; 3rd Generation Partnership Project, Mobile Competence Centre, France, vol. RAN WG3, No. Kansas City, USA; Apr. 30, 2008, 3 pgs.
The Extended European Search Report dated Dec. 15, 2017 for European patent application No. 15822829.6, 16 pages.
The Extended European Search Report dated Sep. 27, 2017 for European Patent Application No. 15821476.7, 16 pages.
Ericsson, "Clarification of conditions for transfer of calls in an early phase", retrieved on Mar. 3, 2014 at <<http://www.3gpp.org/ftp/Meetings_3GPP_SYNC/CT/CT/Docs/>>, 3GPP Draft, 3rd Generation Partnership Project, Mobile Competence Centre, France, vol. CT WG1, No. Guangzhou Jan. 20, 2014-Jan. 24, 2014, 2014, 9 pages.
Nsn, et al., "Correct request for PS to CS cancelled handling", retrieved on Mar. 3, 2014 at <<http://www.3gpp.org/ftp/Meetings_3GPP_SYNC/CT/CT/Docs/>>, 3GPP Draft, 3rd Generation Partnership Project, Mobile Competence Centre, France, vol. CT WG1, No. Guangzhou Jan. 20, 2014-Jan. 24, 2014, 2014, 3 pages.

Office action for U.S. Appl. No. 14/552,871, dated Jan. 11, 2018, Mufti, "Telecommunication Network Pre-Establishment Service Interruption Response", 19 pages.
Office action for U.S. Appl. No. 14/689,318, dated Oct. 19, 2017, Mufti, "Telecommunications Network Non-Establishment Response", 25 pages.
Office Action for U.S. Appl. No. 14/552,945, dated Aug. 31, 2017, Shujaur Mufti, "Telecommunication Equipment Measuring Pre-Establishment Service Interruptions", 35 pages.
Office Action for U.S. Appl. No. 14/552,871, dated Sep. 21, 2017, Mufti, "Telecommunication Network Pre-Establishment Service Interruption Response" 28 pages.
The Chinese Office Action dated Aug. 14, 2018 for Chinese patent application No. 201580051477.5, a counterpart foreign application of U.S. Pat. No. 9,699,211.
The European Office Action dated Aug. 6, 2018 for European patent application No. 15821476.7, a counterpart foreign application of U.S. Appl. No. 14/552,871, 5 pages.
The Chinese Office Action dated May 8, 2018 for Chinese patent application No. 201580051477.5, a counterpart foreign application of U.S. Pat. No. 9,699,211.
Office action for U.S. Appl. No. 14/552,871, dated Apr. 19, 2018, Mufti, "Telecommunication Network Pre-Establishment Service Interruption Response", 6 pages.
The European Office Action dated Feb. 22, 2019 for European patent application No. 15821476.7, a counterpart foreign application of U.S. Appl. No. 14/552,871, 13 pages.
The Chinese Office Action dated Aug. 19, 2019 for Chinese Patent Application No. 201580040249.8, a counterpart of U.S. Pat. No. 10,039,019, 8 pages.
The Chinese Office Action dated Aug. 19, 2019 for Chinese Patent Application No. 201580038224.4, a counterpart of U.S. Pat. No. 10,004,004, 12 pages.
The Chinese Office Action dated Jul. 24, 2019 for Chinese Patent Application No. 201580041343.5, a counterpart of U.S. Appl. No. 14/568,633, x pages.
The Chinese Office Action dated Aug. 15, 2019 for Chinese Patent Application No. 201580038651.2, a counterpart of U.S. Pat. No. 10,080,163, 23 pages.
The European Office Action dated Jun. 3, 2019 for European Patent Application No. 15830023.6, a counter part of U.S. Pat. No. 9,699,211, 7 pages.
Office action for U.S. Appl. No. 14/552,945, dated Nov. 30, 2016, Mufti, "Telecommunication Equipment Measuring Pre-Establishment Service Interruptions", 28 pages.
Office action for U.S. Appl. No. 14/552,945, dated May 18, 2016, Mufti, "Telecommunication Equipment Measuring Pre-Establishment Service Interruptions", 29 pages.
Office action for U.S. Appl. No. 14/815,831, dated May 19, 2016, Mufti et al., "Telecommunications Network Emergency-Call Handover", 15 pages.

* cited by examiner

SUPPRESSING THIRD PARTY REGISTRATION AND THIRD PARTY DEREGISTRATION ACTIONS

CROSS-REFERENCE TO RELATED APPLICATION

This application is a non-provisional application of, and claims priority to and the benefit of, U.S. Patent Application Ser. No. 62/033,026 filed Aug. 4, 2014 and entitled "Volte and Emergency Calling" the entirety of which is incorporated herein by reference.

BACKGROUND

Use of packet-switched connections for transmitting synchronous communications, such as voice calls, and data across telecommunication networks is increasing. Such packet-switched connections allow for greater speed and throughput than do circuit-switched connections, and also make packet-switched data from other networks, such as the Internet, more readily available. Most telecommunication networks, however, also utilize other types of access networks. For example, telecommunication networks may utilize access networks that provide circuit-switched connections, such as Global System for Mobile Communications (GSM) networks or Universal Mobile Telecommunications System (UMTS) networks. The telecommunication networks might also utilize other types of access networks (e.g., Wi-Fi) during a communication session.

For instance, a mobile device might switch between a Wi-Fi access network and a GSM network or a Long Term Evolution (LTE) access network during a communication session. Switching between these different access networks may result in a large number of registration requests and deregistration requests being generated within an Internet Protocol Multimedia Subsystem (IMS) that delivers IP multimedia services. For example, each time the access network changes during the communication session, the user equipment (UE) may connect to a different access device that causes a registration request and deregistration request to be generated with one or more application servers in the IMS.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, suppressing third party register (TPR) actions and third party deregister (TPDR) actions that are received by a telecommunication network device in response to a UE switching access networks. For example, during a communication session, a UE may switch between different access networks. Each time the UE switches to a different access network, a registration request may be received by a telecommunication network device, such as a serving call session control function (S-CSCF) server in an IMS.

The registration request may include a feature tag that specifies different features to register with one or more application servers in the IMS. For example, the feature tag may include features, such as, but not limited to multimedia telephony (MMTEL) features, short message session initiation protocol (SMSIP) features, rich communication services (RCS) features, and the like.

In some configurations, the S-CSCF server receives the registration request from an access device, such as a Proxy-CSCF (P-CSCF) server, and determines whether to perform a registration action with one or more application servers in the IMS. According to some configurations, the registration actions include TPR actions and TPDR actions. A TPR action may include registering a requested feature with an application server. For example, a TPR action may cause an SMSIP feature to be registered with an application server. A TPDR action may cause a registered feature to be deregistered with an application server. For example, a TPDR action may cause a previously registered SMSIP feature to be removed from the application server.

Instead of automatically performing a TPR action or a TPDR action for each registration request that occurs in response to the UE switching access networks, a determination is made as to whether to perform the TPR action or a TPDR action. The determination may include comparing the requested features specified by the registration request with the currently registered features. For example, when a requested feature is already registered with an application server, a TPR action may not be performed. When a requested feature is not already registered, a TPR action may be performed with an application server. Similarly, when a registration request is received, the currently registered features associated with the UE may not be deregistered from the application server. Instead, currently registered features may be deregistered with an application server when the currently registered features are not requested features specified by the registration request.

Figure 1:
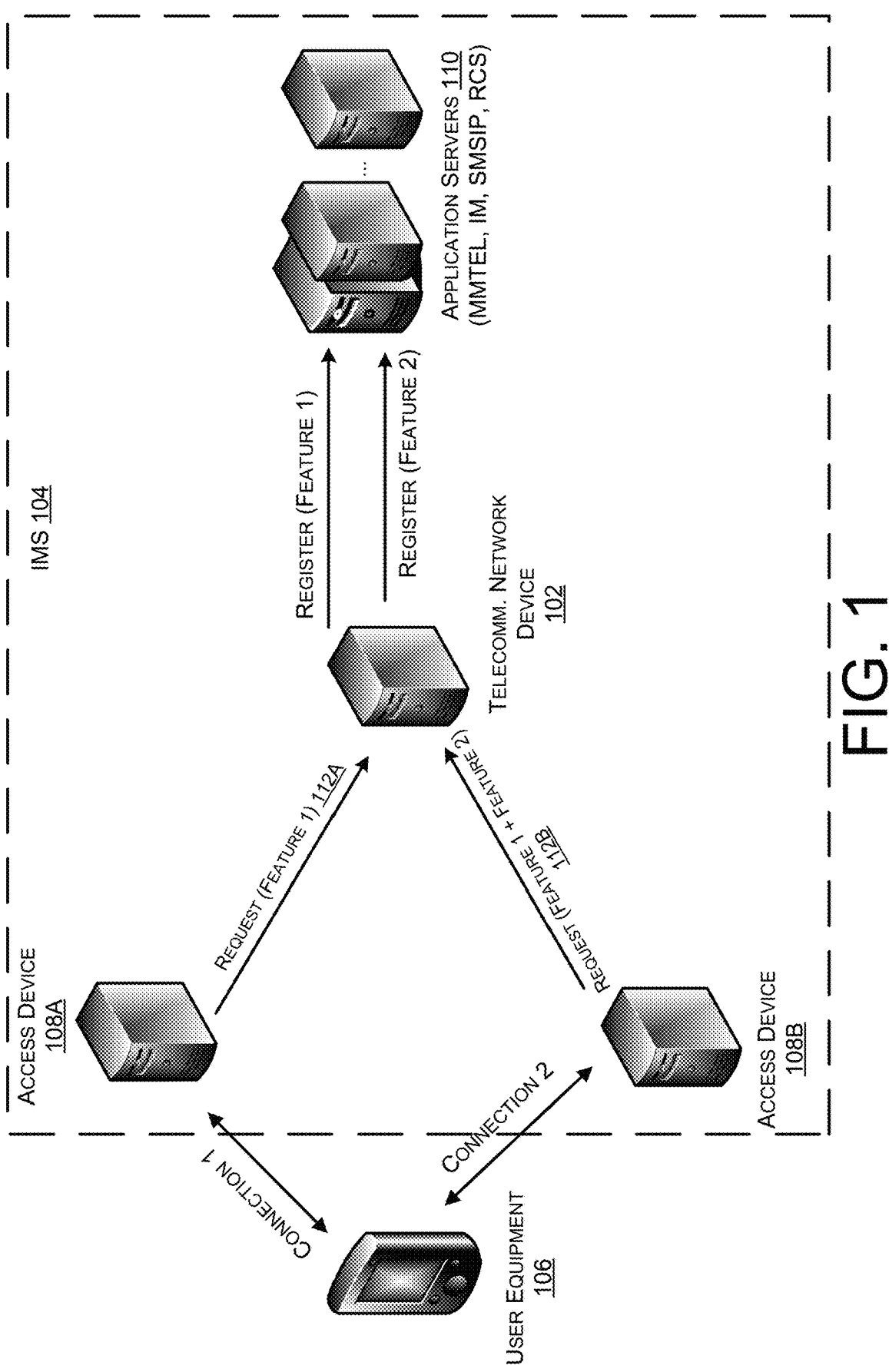
FIG. 1 illustrates an overview of devices involved in initiating and suppressing third party registration actions and third party deregistration actions that may occur in response to user equipment switching access networks.

FIG. 1 illustrates an overview of devices involved in initiating and suppressing TPR and TPDR actions that may occur in response to user equipment switching access networks. As shown in FIG. 1, a telecommunication network device 102 may determine whether or not to perform a TPR action or a TPDR action in the IMS 104 in response to the UE 106 switching access networks.

The UE 106 may switch between different types of access networks. For example, the UE 106 may switch from a packet-switched access network to a circuit-switched access network. The UE 106 may also switch between a Wi-Fi access network to a packet-switched access network. Generally, the UE 106 might switch between a first access network of a first type and a second access network of a second, different type.

Figure 3:
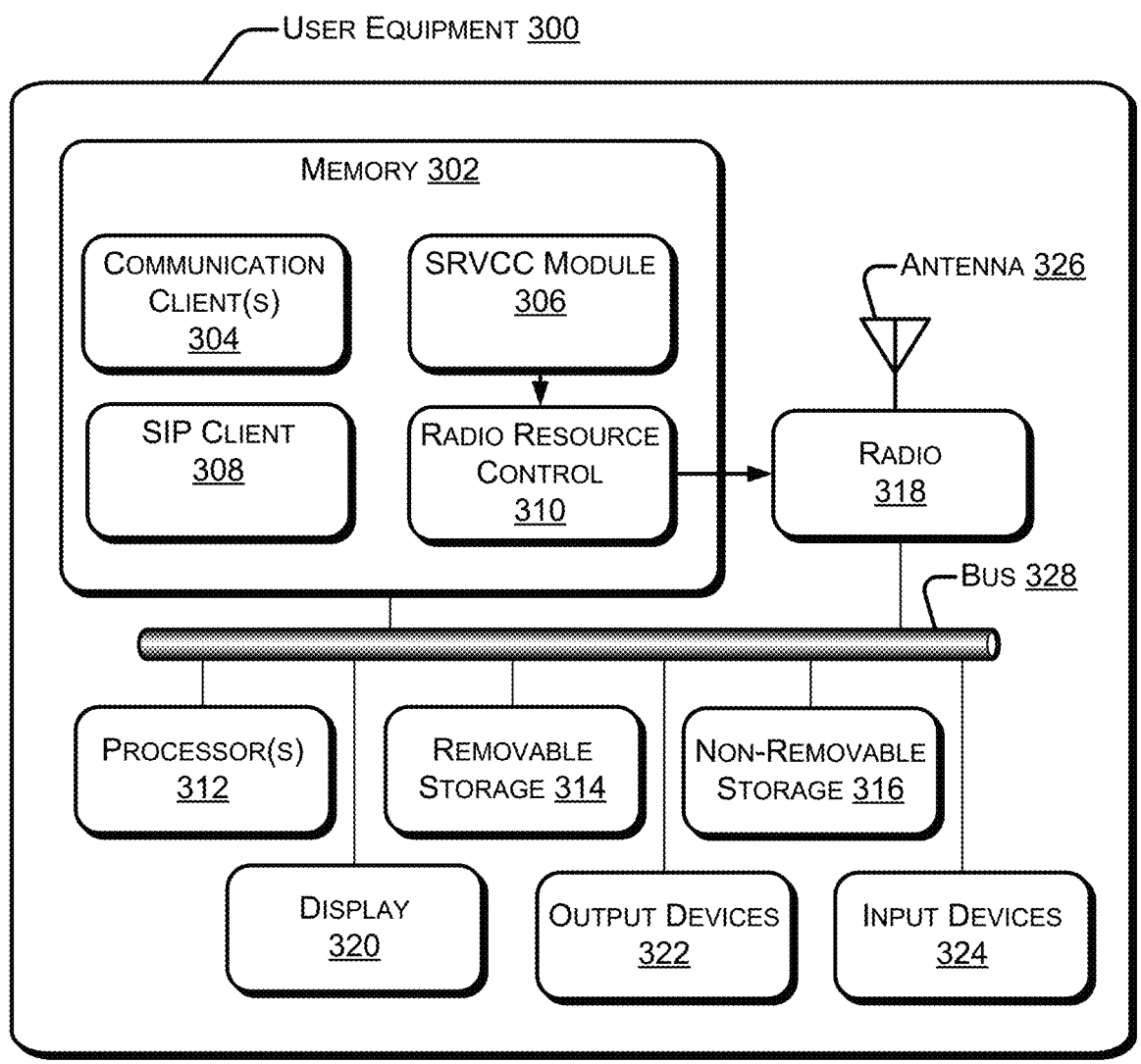
FIG. 3 illustrates a component level view of user equipment capable of connecting to a plurality of access networks, of measuring those access networks, of providing measurement reports, of engaging in a communication session, and of switching access networks used for the communication session.

The UE 106 may be any sort device capable of cellular or wireless network communication, such as a cellular phone, a tablet computer, a personal digital assistant (PDA), a personal computer (PC), a laptop computer, a media center, a work station, etc. An example user equipment 106 is illustrated in FIG. 3 and described below with reference to that figure.

In some examples, the UE 106 may have a radio and be configured to tune that radio to licensed wireless spectrum utilized by circuit-switched access networks and packet-switched access networks, such as LTE access networks. The UE 106 may also be configured to tune the radio to wireless spectrum utilized by packet-switched access networks, such as Global System for Mobile Communications (GSM) access networks or Universal Mobile Telecommunications System (UMTS') access networks. When equipped with a single radio, the UE 106 may be connected to one of these access networks at a time.

The UE 106 may further be configured to initiate or receive data associated with a communication session, such as a voice call, a video call, or another sort of synchronous communication. Initiation of such communications may involve communication clients and session initiation protocol (SIP) clients to communicate with session continuity components of the telecommunication network.

As discussed herein, a communication session may be cancelled, e.g., on a first access network, and re-initiated, e.g., on a second access network. This may be transparent to the user. Stated another way, a person using the UE 106 may not experience an indication that a cancellation and re-initiation has occurred. Alternatively, any user-perceptible indication may be transitory, e.g., interruptions in audio of a voice call lasting less than some period of time (e.g., one second). Switching access networks may include a cancellation and re-initiation managed by components of the telecommunications network (e.g., telecommunications network device 102, access devices 108A-108B, or application servers 110).

In the current example illustrated in FIG. 1, the UE 106 may initiate a first communication session (e.g., connection 1) with a first access network. An access network may be secured using, for example, information from a SIM card of the UE 106, or may be unsecure. The access network connects the UE 106 to a telecommunication network, such as the IMS 104. In the current example, the UE 106 connects to the access device 108A that is associated with a first access network (not shown). According to some configurations, the access device 108A and the access device 108B are P-CSCF devices. In some examples, the UE 106 is provisioned with P-CSCF addresses for the different access networks that the UE 106 may switch between during a communication session. The provisioning may be performed manually, or dynamically using Dynamic Host Configuration Protocol (DHCP)/Domain Name System (DNS) procedures or during the General Packet Radio Service (GPRS) context creation (in the case of Universal Mobile Telecommunications Service (UMTS) access). During registration, the UE 106 establishes with the P-CSCF secure connections for signaling. The access devices 108A-108B may be the first point of contact for the UE 106. The access devices 108A-108B may be located in the IMS 104, or in a visited network.

Figure 4:
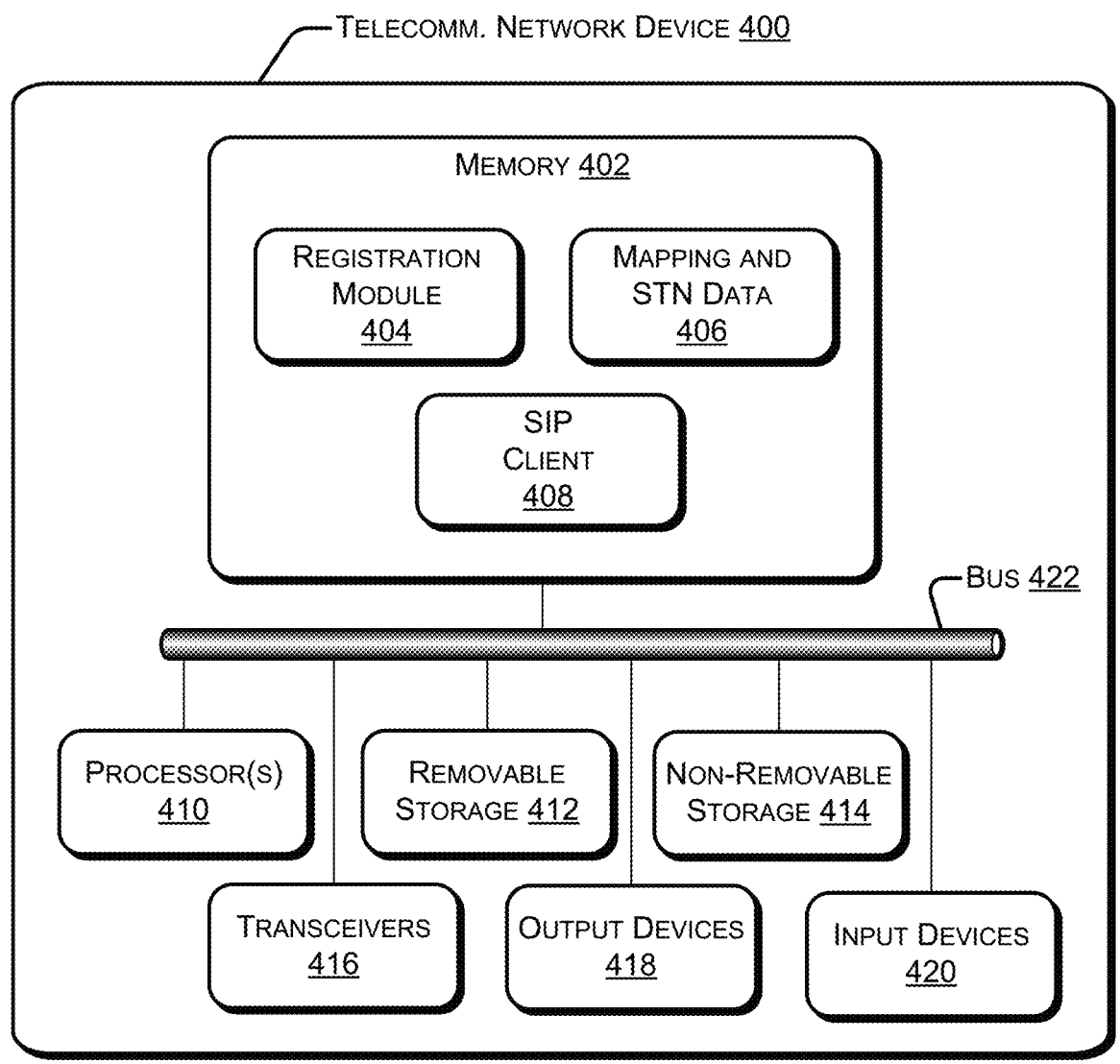
FIG. 4 illustrates a component level view of a telecommunication network device capable of suppressing third party registration and/or third party deregistration actions.

The access devices 108A-108B communicate with one or more other devices, such as the telecommunication network device 102, within the IMS 104. An example telecommunication network device 102 is illustrated in FIG. 4 and described below with reference to that figure. Further, the telecommunication network device 102, the access devices 108A-108B, and the application servers 110, may each be or include a server or server farm, multiple, distributed server farms, a mainframe, a work station, a personal computer (PC), a laptop computer, a tablet computer, an embedded system, or any other sort of device or devices. In some examples, one or more of telecommunication network device 102, the access devices 108A-108B, and the application servers 110 may represent a plurality of computing devices working in communication, such as a cloud computing network of nodes. Also, the telecommunication network device 102, the access devices 108A-108B, and the application servers 110 may each be or include devices of a telecommunication network.

In various configurations, the telecommunication network device 102 is an S-CSCF server that may be operative to perform session control for the UE 106. In some examples, the telecommunication network device 102 may initiate the communication session by passing messages to appropriate device(s) of the telecommunication network, such as the application servers 110.

The telecommunication network device 102 may also receive registration requests, such as the request 112A and the request 112B. In some configurations, the requests 112A-112B are registration requests associated with the UE 106 that specify one or more features to register with one or more of the application servers 110. For example, the registration request 112A requests to register for "feature 1." The registration request 112B requests to register for "feature 1" and "feature 2." As briefly discussed above, the features might be any feature provided by one or more of the application servers 110 (e.g., MMTEL, IM, SMSIP, or RCS).

According to some configurations, the telecommunication network device 102 (e.g., an S-CSCF server) is operative to authenticate users and store SIP contact addresses of UEs for a public identity. In initializing the communication session, the UE 106 may register the communication session with the IMS 104. To do this, the UE 106 may send an initiation SIP register request to the IMS 104 via an access device 108A or 108B (e.g., P-CSCF servers). One of the access devices 108A or 108B may receive the SIP register request, and may identify the telecommunication network device 102 using one or more components of the IMS 104.

As briefly discussed above, each time the UE 106 switches access networks, the telecommunication network device 102 may receive a registration request from the access device that is associated with the access network. According to some configurations, each access network is associated with a different access device (e.g., a P-CSCF server).

In some examples, following the guidelines provided by 3GPP 24.229 Section 5.4.1.2.1 to handle the UE 106 switching access networks may result in unexpected results. Section 5.4.1.2.1 of the 3GPP 24.229 version 12.6.0 release 12 of the technical specification recites: "2) if the multiple registrations is not used and if the authentication that in step 1) has been successful, and there are public user identities (including the public user identity being registered, if previously registered) that belong to this user that have been previously registered with the same private user identity, and with an old contact address different from the one received in the REGISTER request, and the previous registrations have not expired, perform the network initiated deregistration procedure (as described in subclause 5.4.1.5) for the previously registered public user identities belonging to this user including the public user identity being registered, if previously registered."

In some configurations, if the above section 5.4.1.2.1 is implemented as recited, race conditions may occur in an operator environment that may be due to possible delays in the IP layer if TPR and TPDR actions are happening against the same application server. For example, upon receiving a contact header change that may be received in response to the UE 106 changing access devices (e.g., from the access device 108A to the access device 108B), the telecommunication network device 102 (e.g., an S-CSCF) initiates a TPR action and TPDR action towards one or more of the application servers 110.

In some cases (e.g., due to IP delay), the TPR action may reach the application server before the TPDR action reaches the application server. As a result, the application server refreshes the registration first and then deregisters the subscriber. As such, the subscriber registration binding is removed from the application server thereby causing failures in the communication session.

In some configurations, to help prevent this possible race condition from occurring, section 5.4.1.2.1 may be restated as: "2) if the multiple registrations is not used and if the authentication that in step 1) has been successful, and there are public user identities (including the public user identity being registered, if previously registered) that belong to this user that have been previously registered with the same private user identity, and with an old contact address different from the one received in the REGISTER request, and the previous registrations have not expired, perform the network initiated deregistration procedure (as described in subclause 5.4.1.5) for the previously registered public user identities belonging to this user including the public user identity being registered, if previously registered except the case where ICSI Feature Tags in the previous CONTACT header is similar as new CONTACT header then don't perform network initiated de-registration for that ICSI CONTACT."

According to some configurations, the telecommunication device 102 is operative to implement the revised section 5.4.1.2.1 and suppress third party register (TPR) actions and third party deregister (TPDR) actions that may be initiated in response to the UE 106 switching access networks. As discussed above, each time the UE 106 moves to a different access network, a registration request may be sent by the access device associated with the different access network that may be received by the telecommunication network device 102, such as an S-CSCF server, in the IMS 104. The registration request may include a contact address associated with the UE 106.

In some configurations, the registration request may include a feature tag that specifies one or more features to register for with one or more of the application servers 110. For example, the feature tag may include features, such as, but not limited to multimedia telephony (MMTEL) features, short message session initiation protocol (SMSIP) features, rich communication services (RCS) features, and the like.

In some examples, the telecommunication network device 102 receives the registration request from the access device 108A or 108B and determines whether to perform a registration action, such as a TPR action or a TPDR action. Instead of automatically performing a TPR action or a TPDR action for each registration request as specified by 3GPP 24.229 section 5.4.1.2.1, a determination is made by the telecommunication device 102 as to whether to perform the TPR action or a TPDR action.

The determination performed by the telecommunication network device 102 may include comparing the requested features specified by the registration request with the currently registered features. For example, when a requested feature is already registered with the application servers 110, a TPR action may not be performed. When a requested feature is not already registered with the application servers 110, a TPR action may be performed with an application server. Similarly, when a registration request is received, the currently registered features associated with the UE 106 may not be deregistered from the application servers 110. Instead, currently registered features may be deregistered with the application servers 110 when the requested features in the registration request do not include one or more of the currently registered features.

In the example illustrated in FIG. 1, the telecommunication network device 102 receives a first request 112A that requests to register "feature 1." Since "feature 1" is not currently registered with at least one of the application servers 110, the telecommunication network device 102 registers "feature 1." In response to the UE 106 switching access networks, the access device 108B sends the request 112B to the telecommunication network device 102 that includes a request to register "feature 1" and "feature 2." Since "feature 1" is currently registered, the telecommunication network device 102 performs a TPR action to register "feature 2" but does not perform a TPR action to register "feature 1." As illustrated, the telecommunication network device 102 did not have to perform any TPDR actions in response to the UE 106 switching access networks. Similarly, the telecommunication network device 102 did re-register a feature that is currently registered with the application servers 110.

Figure 2:
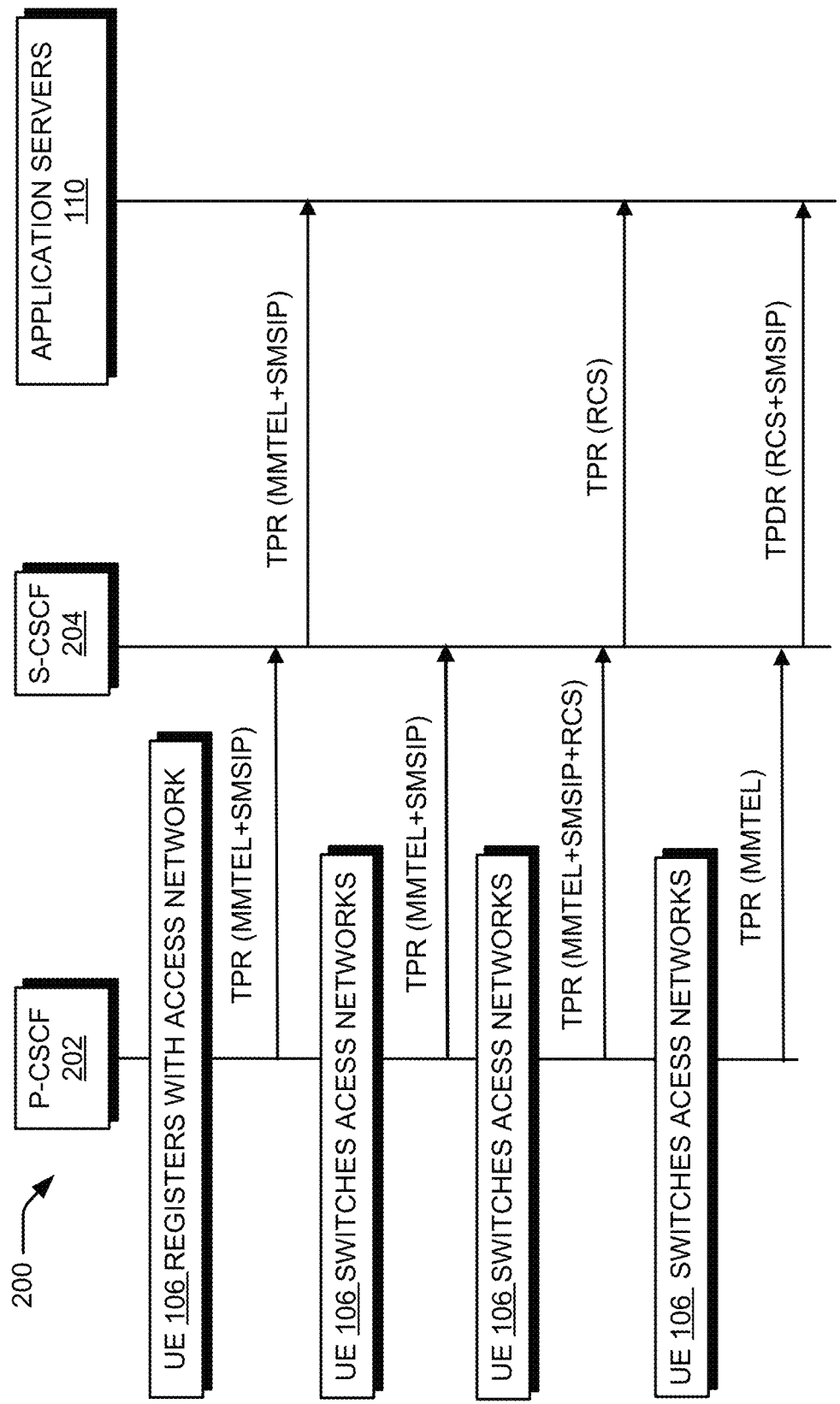
FIG. 2 shows an example registration request flow illustrating an example switch of user equipment between access networks.

FIG. 2 shows an example registration request flow 200 illustrating an example switch of user equipment between access networks. In FIG. 2, boxes across the top and vertical lines descending from those boxes represent user equipment 300, FIG. 3, or telecommunication network devices 400, FIG. 4 (collectively, "nodes). Time increases down the page. Arrows between the vertical lines represent messages between nodes. Moreover, for this and other flows herein, some components and messages are omitted for brevity.

As discussed above, in the telecommunications network, UE 106 (also referred to as a "user device) may switch between access networks during a communication session. During a switch from one access network to another access network, the UE 106 may access a different P-CSCF 202.

As illustrated, the UE 106 may initially register with an access network. According to some configurations, the P-CSCF 202 receives the registration request from the UE 106 and transmits a TPR to the S-CSCF 204. In the current example, the P-CSCF 202 transmits a TPR to the S-CSCF 204 to register the MMTEL and SMSIP features. The S-CSCF node 204 receives the request and determines whether to perform a registration action with one or more of the application servers 110. In response to the S-CSCF 204 determining that the MMTEL and SMSIP features have not been registered with the application servers 110, the S-CSCF 204 registers the MMTEL and SMSIP features with one or more of the application servers 110.

After the UE 106 switches access networks, the P-CSCF 202 transmits a TPR to the S-CSCF node 204 to register the MMTEL and SMSIP features. The S-CSCF node 204 receives the request and determines whether to perform a registration action. In response to the S-CSCF 204 determining that the MMTEL and SMSIP features have already been registered with the application servers 110, the S-CSCF 204 does not perform a TPR action with the application servers 110.

After the UE 106 switches access networks again, the P-CSCF 202 transmits a TPR to the S-CSCF 204 to register the MMTEL, SMSIP, and RCS features. The S-CSCF 204 receives the request and determines whether to perform a registration action. In response to the S-CSCF 204 determining that the RCS feature has not been registered, the S-CSCF 204 performs a TPR action to register the RCS feature with one or more of the application servers 110. In response to the S-CSCF 204 determining that the MMTEL and SMSIP features have already been registered, the S-CSCF 204 does not perform a TPR action regarding the MMTEL and SMSIP features with one or more of the application servers 110.

After the UE 106 switches access networks yet again, the P-CSCF 202 transmits a TPR to the S-CSCF 204 to register the MMTEL feature. The S-CSCF 204 receives the request and determines whether to perform a registration action. In response to the S-CSCF 204 determining that the MMTEL, SMSIP and RCS features are currently registered, the S-CSCF 204 performs a TPDR action to deregister the RCS and SMSIP features. In response to the S-CSCF 204 determining that the MMTEL feature has already been registered, the S-CSCF 204 does not perform a TPR action regarding the RCS feature with one or more of the application servers 110. The example flow described with regard to FIG. 2 are illustrative, and not intended to be limiting.

Example Devices

FIG. 3 illustrates a component level view of user equipment 300 capable of connecting to a plurality of access networks, of measuring those access networks, of providing measurement reports, of engaging in a communication session, and of switching access networks used for the communication session. The user equipment 300 may be any sort of user equipment, such as the UE 106.

As illustrated, the user equipment 300 comprises a system memory 302 storing communication client(s) 304, Single Radio Voice Call Continuity (SRVCC) module 306, SIP client 308, and radio resource control 310. Also, the user equipment 300 includes processor(s) 312, a removable storage 314, a non-removable storage 316, radio 318, a display 320, output device(s) 322, input device(s) 324, and one or more antenna(s) 326 connected to radio 318. Processor 312, radio 318, system memory 302, and other illustrated components of user equipment 300 can be communicatively coupled via bus 328, e.g., a PCI or other computer bus.

In various examples, system memory 302 is volatile (such as RAM), non-volatile (such as ROM, flash memory, etc.) or some combination of the two. The communication client(s) 304 stored in the system memory 302 may enable the user equipment 300 to initiate and carry on communication sessions. The communication client(s) 304 may include voice call handlers, video calling clients, gaming and media clients, etc. The communication client(s) 304 may utilize a policy, preferences, etc. in determining which of a number of available access networks the communication client(s) 304 should use in initiating communication sessions. For example, the communication client(s) 304 may utilize a policy or preference that prefers LTE access networks to GSM access networks, and GSM access networks to other circuit-switched access networks.

The SRVCC module 306 may perform a number of functions, such as interfacing with the radio 318 through the radio resource control 310, receiving instructions, such as measurement gap instructions, instructions preparing the user equipment 300 for a handover between different networks, and instructions to complete a handover by tuning the radio 318, performing measurements of access networks, generating measurement reports that include the measurements, and providing the measurement reports to the telecommunication network.

The SIP client 308 may participate with the communication client(s) 304 in initiating a communication session by, for example, formulating a SIP REGISTER request and sending the SIP REGISTER request to the telecommunication network.

The radio resource control 310 may, for example, be a radio resource control layer of the user equipment 300 and may interact with the radio 318 and other modules and components of the user equipment 300 in order to tune the radio 318 and communicate using the radio 318.

In some examples, the processor(s) 312 is a central processing unit (CPU), a graphics processing unit (GPU), or both CPU and GPU, or any other sort of processing unit. Example processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and processors incorporating more than one type of device (e.g., a CPU and an FPGA on a single die).

User equipment 300 may also include additional data storage devices (removable and/or non-removable) such as, for example, magnetic disks, optical disks, or tape. Such additional storage is illustrated in FIG. 3 by removable storage 314 and non-removable storage 316. Tangible computer-readable media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the user equipment 300. Any such tangible computer-readable media may be part of the user equipment 300.

In some examples, the radio 318 includes any sort of radio known in the art. For example, radio 318 may be a radio transceiver that performs the function of transmitting and receiving radio frequency communications. The radio interface may facilitate wireless connectivity between the user equipment 300 and various cell towers, base stations and/or access points of access networks, e.g., packet-switched or circuit-switched networks.

In various examples, the display 320 is a liquid crystal display, organic light-emitting diode (OLED) display, or any other type of display commonly used in telecommunication devices. For example, display 320 may be a touch-sensitive display screen, and can then also act as an input device or keypad, such as for providing a soft-key keyboard, navigation buttons, or the like.

In some examples, the output devices 322 include any sort of output devices known in the art, such as a display (already described as display 320), speakers, a vibrating mechanism, or a tactile feedback mechanism. Output devices 322 also include ports for one or more peripheral devices, such as headphones, peripheral speakers, or a peripheral display.

In various examples, input devices 324 include any sort of input devices known in the art. For example, input devices 324 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of a telecommunication network device 400 capable of suppressing TPR and/or TPDR actions. The telecommunication network device 400 may be any sort of equipment, such as telecommunication network device 102, access devices 108A-108B, or some other device utilized within a telecommunications network. As illustrated, the telecommunication network device 400 comprises a system memory 402 storing a registration module 404, mappings and STN data 406, and a SIP client 408. Also, the telecommunication network device 400 includes processor(s) 410, a removable storage 412, a non-removable storage 414, transceivers 416, output device(s) 418, and input device(s) 420, any or all of which can be communicatively connected via bus 422.

In various examples, system memory 402 is volatile (such as RAM), non-volatile (such as ROM, flash memory, etc.) or some combination of the two. The registration module 404 stored in the system memory 402 may perform a number of functions, including mechanisms disclosed herein for suppressing TPR and/or TPDR actions. Further details of functions that may be performed by registration module 404 are discussed herein and below with reference to FIGS. 5-7.

The mapping and STN data 406 may include mappings of circuit-switched access networks to servers, such as MSSs, and mappings of proxy call session control functions (P-CSCFs) to ATCFs and STN-SRs. The SIP client 408 may enable user equipment to perform a SIP registration for a communication session with an IMS, such as the IMS 104, or other session continuity components.

In some examples, the processor(s) 410 is a central processing unit (CPU), a graphics processing unit (GPU), or both CPU and GPU, or any other sort of processing unit described above with reference to processor 312.

The telecommunication network device 400 also includes additional data storage devices (removable and/or non-removable) such as, for example, magnetic disks, optical disks, or tape. Such additional storage is illustrated in FIG. 4 by removable storage 412 and non-removable storage 414. System memory 402, removable storage 412 and non-removable storage 414 are all examples of computer-readable storage media. Tangible computer-readable media and computer-readable storage media can be as discussed above with reference to removable storage 314 and non-removable storage 316.

In some examples, the transceivers 416 include any sort of transceivers known in the art. For example, transceivers 416 may include a radio transceiver that performs the function of transmitting and receiving radio frequency communications. Also, or instead, the transceivers 416 may include other wireless or wired connectors, such as Ethernet connectors or near-field antennas. The transceivers 416 may facilitate connectivity between a public network, such as a packet-switched access network (not shown), and one or more other devices of a telecommunication network.

In some examples, the output devices 418 include any sort of output devices known in the art, such as a display, speakers, a vibrating mechanism, or a tactile feedback mechanism. Output devices 418 also include ports for one or more peripheral devices, such as headphones, peripheral speakers, or a peripheral display.

In various examples, input devices 420 include any sort of input devices known in the art. For example, input devices 420 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
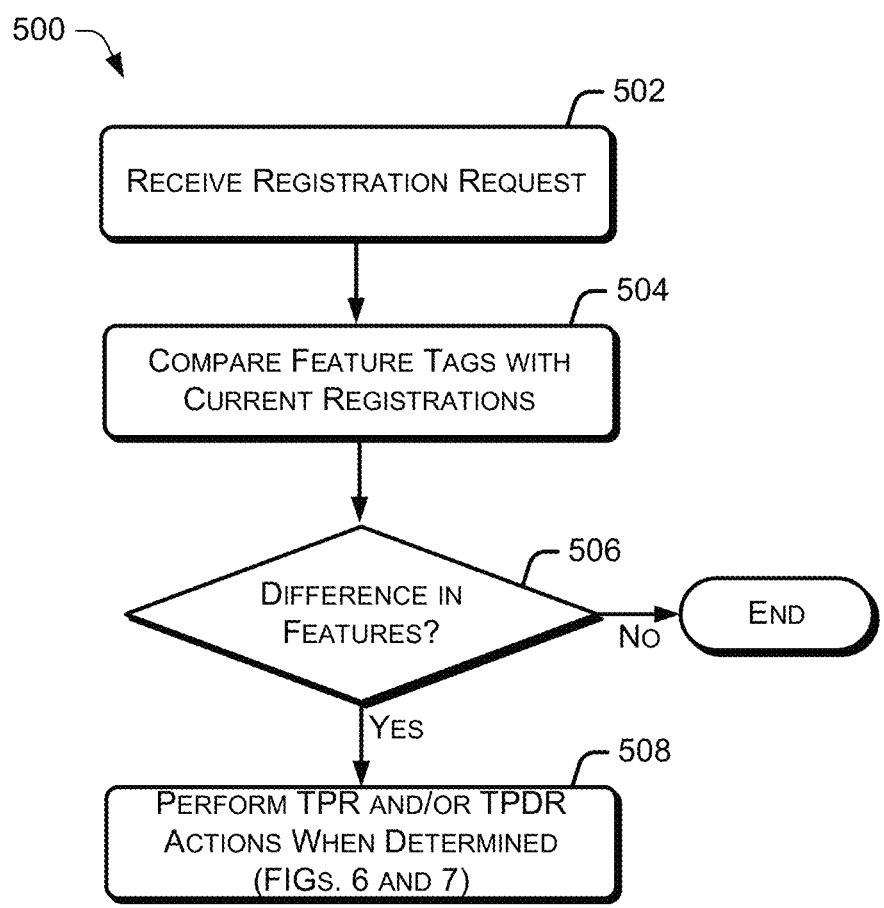
FIG. 5 illustrates an example process performed by telecommunication equipment in response to receiving a registration request associated with user equipment changing an access network.
Figure 6:
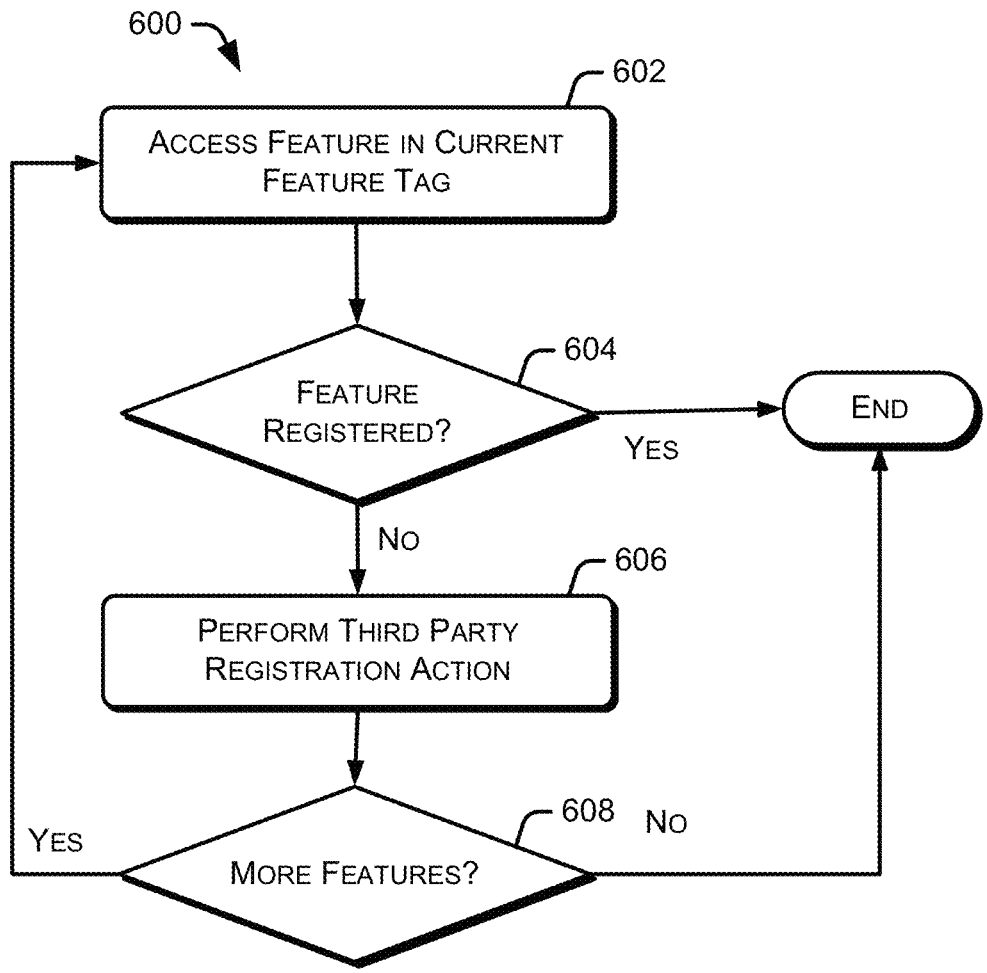
FIG. 6 is an example process showing an example of performing a third party registration action.
Figure 7:
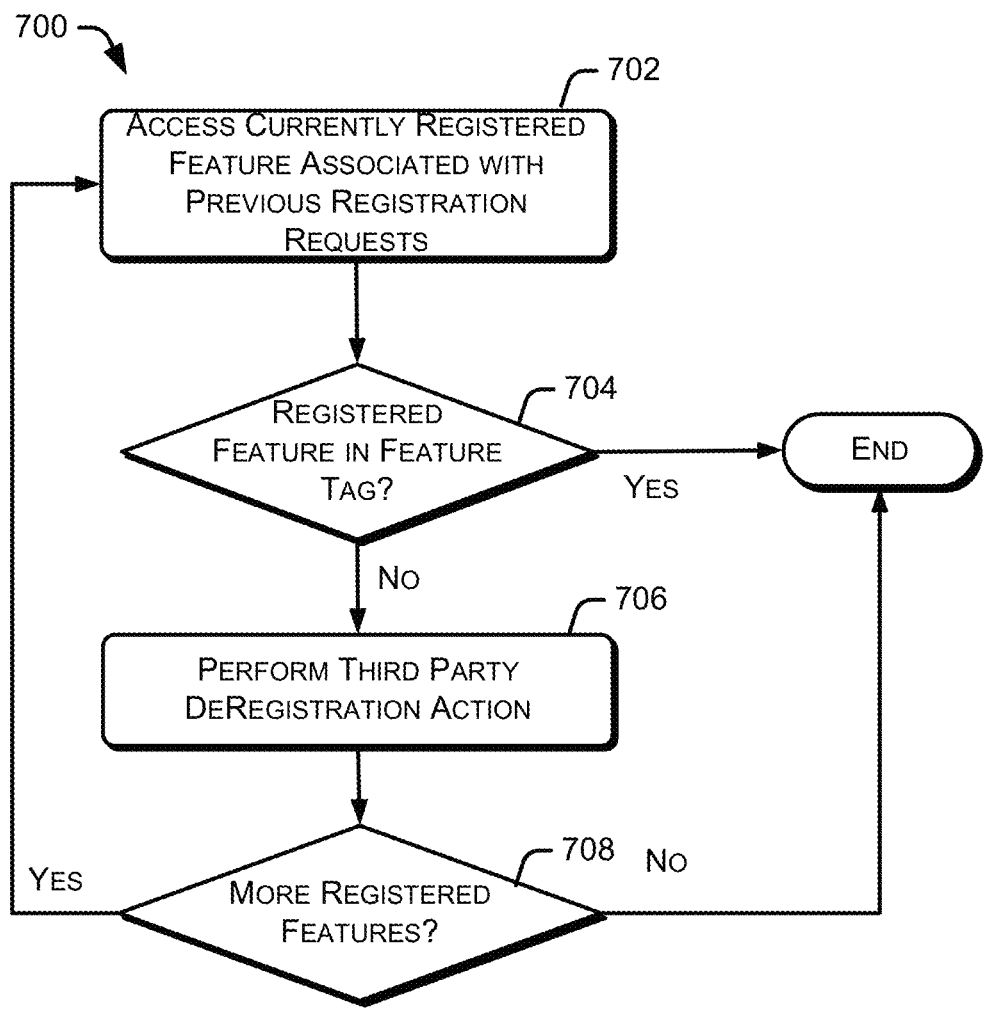
FIG. 7 is an example process showing an example of performing a third party deregistration action.

FIGS. 5-7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 performed by telecommunication equipment in response to receiving a registration request associated with user equipment changing an access network.

The process includes, at 502, receiving a registration request. As discussed above, the registration request may originate from an access device 108A (e.g., a P-SCSF) and be received by a telecommunication network device 102 (e.g., an S-CSCF) that is associated with the UE 106 switching access networks. For example, the registration request may be generated in response to a network change, such as from Wi-Fi to LTE, by the UE 106. According to some examples, the registration request includes a contact card associated with the UE 106 that specifies one or more feature tags to register with one or more application servers 110.

At 504, the feature tag from the registration request is compared with the currently registered features. As discussed above, the currently registered features with the application servers 110 may be associated with previously received feature tags received during one or more previous registration requests received by the telecommunication network device 102. Generally, feature tags specify features to be provided by one or more of the application servers 110 in the IMS 104. Some example feature tags may include, but are not limited to MMTEL features, SMSIP features, RCS features, and the like.

At 506, a determination is made as to whether there is a difference between the features specified by the current feature tag associated with the registration request and currently registered features. As discussed above, the determination may be performed by telecomunication network device 102, or some other device. In some examples, the telecomunication network device 102 compares the current feature tag with the previous feature tags received during the communication session associated with the UE 106. When there is not a difference in features (e.g., all of the requested features to register have already been registered and there are not any registered features that are not requested), the process 500 moves to an end operation. When there is a difference in features, the process moves to 508.

At 508, one or more TPR actions and/or one or more TPDR actions may be performed by the telecommunication device 102 when determined. As discussed above, the TPR actions are performed by the telecommunication device 102 when the current feature tag specifies a feature that has not yet been registered with the one or more application servers 110. Similarly, the TPDR actions are performed by the telecommunication device 102 when the currently registered features include a feature that is not requested to be registered by the current feature tag.

FIG. 6 is an example process 600 showing an example of performing a third party registration action. At 602, a feature in the feature tag specified by the current registration request is accessed. As discussed above, a feature tag may include one or more different features, such as but not limited to MMTEL, SMSIP, and RCS.

At 604, a determination is made as to whether the feature has already been registered with one or more of the application servers 110. As discussed above, the feature may already have been registered with the application server in response to a previous registration request. When the feature has already been registered, the process 600 proceeds to an end operation. When the feature has not been registered, the process moves to 606.

At 606, the third party registration action is performed. As discussed above, the third party registration action may include the telecommunications network device 102 (e.g., an S-CSCF) performing a third party registration with one or more of the application servers 110 that provide the specified feature.

At 608, a determination is made as to whether there are more features specified in the current feature tag. When there are not more features, the process 600 moves to an end operation. When there are more features in the current feature tag, the process 600 returns to 602.

FIG. 7 is an example process 700 showing an example of performing a third party deregistration action. At 702, a currently registered feature is accessed. As discussed above, a previous registration request may have caused one or more features to be registered with one or more of the application servers 110. For example, the features previously registered, and associated with the UE, may include one or more of MMTEL, SMSIP, or RCS.

At 704, a determination is made as to whether the feature that has already been registered with an application server is specified by the feature tag associated with the current registration request. As discussed above, a previous registration request associated with the UE 106 may have caused the feature to have been registered with one or more of the application servers 110. When the feature has already been registered, and is specified by the feature tag, the process 700 proceeds to an end operation. When the feature has been registered, and the feature is not included in the feature tag, the process moves to 706.

At 706, the third party deregistration action is performed. As discussed above, the third party deregistration action may include the telecommunication network device 102 performing a third party deregistration with one or more of the application servers 110 to remove the specified feature.

At 708, a determination is made as to whether there are more features currently registered (e.g., specified by a previous feature tag associated with the UE 106). When there are not any further features currently registered, the process 700 moves to an end operation. When there are more features, the process 700 returns to 702.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method, comprising:
   receiving, via a first access computing device associated with a first access network, a first registration request associated with a user equipment (UE) on the first access network at a computing device associated with an IP multimedia subsystem (IMS);
   receiving, via a second access computing device associated with a second access network, at least partly in response to the UE switching from the first access network to the second access network, a second registration request associated with the UE on the second access network, the second registration request including a feature tag that specifies requested features to be registered with the IMS;
   accessing registration data for the UE associated with the first registration request, the registration data indicating currently registered features of the UE;
   comparing the currently registered features with the requested features specified by the feature tag, the comparing including determining that a first one of the currently registered features is absent from the feature tag and that a second one of the currently registered features is included in the feature tag;
   performing at least one registration action for the UE on the second access network based, at least in part, on the comparison, the at least one registration action including performing a third-party deregistration action to deregister the first one of the currently registered features with the IMS; and
   refraining from performing a second registration action with the IMS for the UE on the second access network for one of the requested features that corresponds to the second one of the currently registered features.

2. The method of claim 1, wherein performing the at least one registration action comprises performing a third-party registration action in response to determining that at least one requested feature is different from the currently registered features.

3. The method of claim 1, wherein the requested features and the currently registered features include one or more of a multimedia telephony (MMTEL) feature, a short message session initiation protocol (SMSIP) feature, or a rich communication services (RCS) feature.

4. The method of claim 1, wherein the first access network and the second access network are different types of access networks.

5. The method of claim 4, wherein the first access network is one of a packet-switched network, a circuit-switched network, or a Wi-Fi network; and
wherein the second access network is another of the packet-switched network, the circuit-switched network, or the Wi-Fi network.

6. An apparatus, comprising:
a transceiver; and
one or more processors coupled to the transceiver, the one or more processors operative to perform operations, including:
receiving, via a first computing device associated with a first access network, a first feature tag that specifies first features provided by a first group of one or more application servers in an IP multimedia subsystem (IMS), the first feature tag associated with a first registration request by a user equipment (UE) on the first access network,
receiving, via a second computing device associated with a second access network, based at least in part on the UE switching from the first access network to the second access network, a second feature tag that specifies second features provided by a second group of one or more application servers in the IMS, the second feature tag associated with a second registration request by the UE on the second access network,
comparing the first features from the first feature tag to the second features from the second feature tag,
determining a registration action to perform with the second group of one or more application servers based, at least in part, on a difference between the first feature tag and the second feature tag, including determining that at least one of the first features are absent from the second feature tag,
performing the registration action, wherein the registration action includes performing a third-party deregistration action on the second access network to deregister the at least one of the first features,
determining that another of the first features matches a second feature specified by the second feature tag, and
refraining from performing a second registration action, wherein the second registration action includes performing a third-party registration action on the second access network for the second feature;
wherein the first access network and the second access network are different types of access networks.

7. The apparatus of claim 6, wherein the operations further comprise, receiving, from a P-CSCF server, the second registration request for the second access network that includes the second feature tag.

8. The apparatus of claim 6, wherein the first features include one or more of a multimedia telephony (MMTEL) feature, a short message session initiation protocol (SMSIP) feature, or a rich communication services (RCS) feature.

9. The apparatus of claim 6, wherein determining the registration action to perform comprises performing one or more third-party registration actions on the second access network with the second group of one or more application servers in response to determining that the second feature tag includes one or more features that are not specified by the first feature tag.

10. The apparatus of claim 6, wherein the first features and the second features include one or more of a multimedia telephony (MMTEL) feature, a short message session initiation protocol (SMSIP) feature, or a rich communication services (RCS) feature.

11. The apparatus of claim 6, wherein the transceiver couples the apparatus to a P-CSCF computer and wherein the apparatus is operative to perform serving call state control function (S-CSCF) functionality.

12. The apparatus of claim 6, wherein the first access network is one of a packet-switched network, a circuit-switched network, or a Wi-Fi network; and
wherein the second access network is another of the packet-switched network, the circuit-switched network, or the Wi-Fi network.

13. A system, comprising:
a transceiver; and
one or more processors operative to:
receive, from one or more computing devices associated with a first access network, a first registration request associated with a user equipment (UE) on the first access network, the first registration request including a first feature tag that specifies first features provided by a first group of one or more application servers in an IP multimedia subsystem (IMS) on the first access network,
receive, from one or more second computing devices associated with a second access network, based at least in part on the UE switching from the first access network to the second access network, a second registration request associated with the UE on the second access network, the second registration request including a second feature tag that specifies second features provided by a second group of one or more application servers in the IMS on the second access network,
compare the first features from the first feature tag to the second features from the second feature tag,
determine a difference between the first features and the second features, including determining that at least one of the first features are absent from the second feature tag,
determine a registration action to perform involving at least one of the application servers of the second group in the IMS based, at least in part, on the difference between the first feature tag and the second feature tag, the registration action including performing a third-party deregistration action to deregister the at least one of the first features registered in response to the first registration request,
perform the registration action,
determine that one of the first features matches a second feature specified by the second feature tag, and
refrain from performing a second registration action, the second registration action including performing a third-party registration action to register the second feature.

14. The system of claim 13, wherein the first features include one or more of a multimedia telephony (MMTEL) feature, a short message session initiation protocol (SMSIP) feature, or a rich communication services (RCS) feature.

15. The system of claim 13, wherein the transceiver couples the system to a P-CSCF computer and wherein the system is operative to perform serving call state control function (S-CSCF) functionality.

16. The system of claim 13, wherein the first access network is one of a packet-switched network, a circuit-switched network, or a Wi-Fi network; and
   wherein the second access network is another of the packet-switched network, the circuit-switched network, or the Wi-Fi network.

* * * * *